Figure 10:
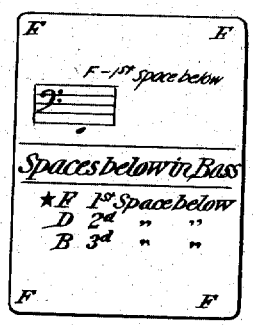
Figure 11:
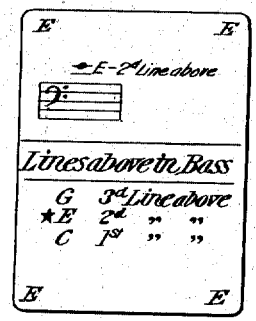
Figure 12:
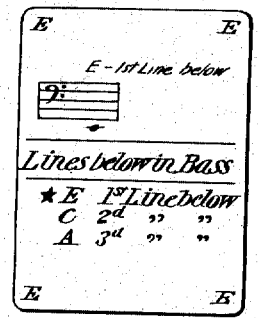

E. E. NOEL.
GAME CARDS FOR TEACHING MUSIC.
APPLICATION FILED APR. 6, 1916.
1,217,810.
Patented Feb. 27, 1917.
3 SHEETS—SHEET 1.
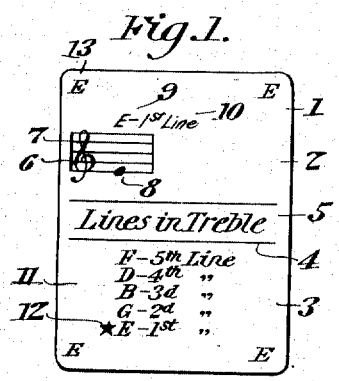
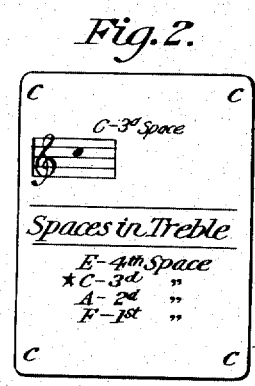
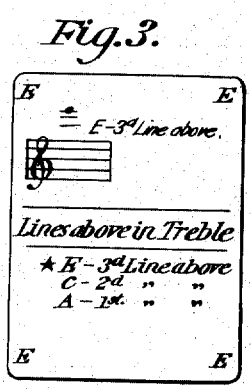
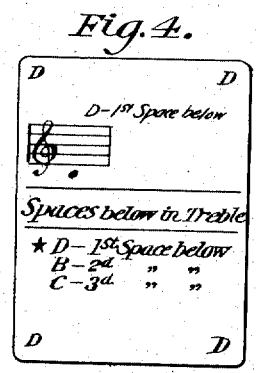
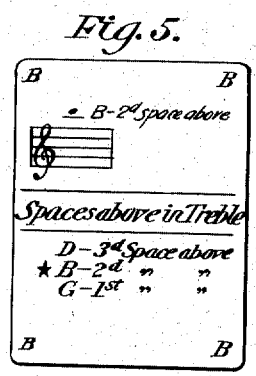
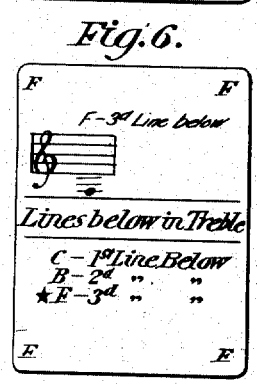
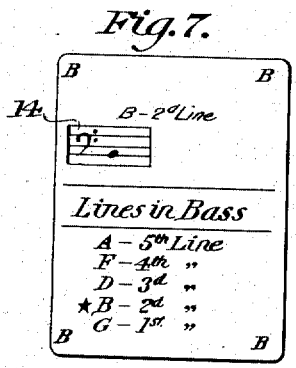
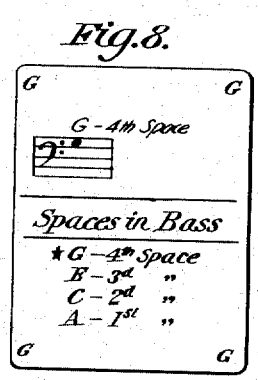
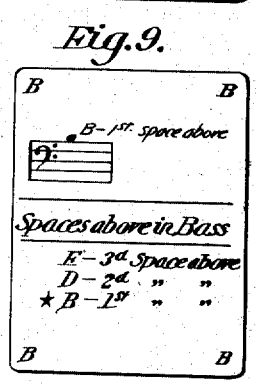
Witnesses
Inventor
Eugene E. Noel
By Victor J. Evans
Attorney

E. E. NOEL.
GAME CARDS FOR TEACHING MUSIC.
APPLICATION FILED APR. 6, 1916.

1,217,810.

Patented Feb. 27, 1917.
3 SHEETS—SHEET 2.

Inventor
Eugene E. Noel

Witnesses

By Victor J. Evans
Attorney

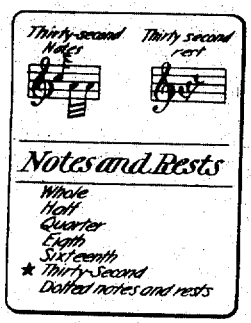
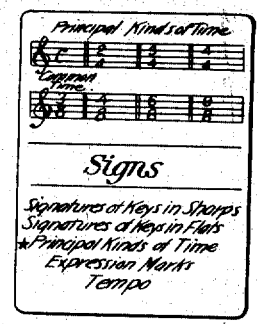
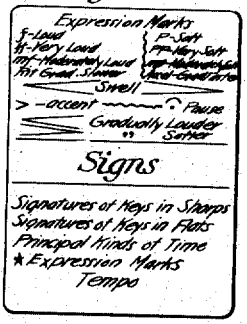
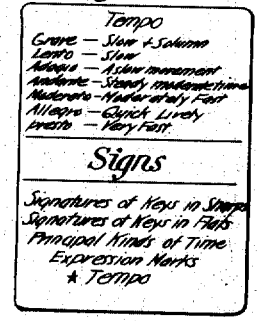
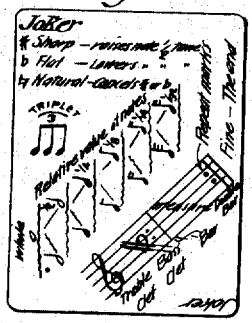

UNITED STATES PATENT OFFICE.

EUGENE E. NOEL, OF INDIANAPOLIS, INDIANA, ASSIGNOR OF ONE-THIRD TO EARL E. CROOKE AND ONE-THIRD TO WARNER C. WILLIAMS, BOTH OF INDIANAPOLIS, INDIANA.

GAME-CARDS FOR TEACHING MUSIC.

1,217,810.  Specification of Letters Patent.  Patented Feb. 27, 1917.

Application filed April 6, 1916. Serial No. 89,395.

*To all whom it may concern:*

Be it known that I, EUGENE E. NOEL, a citizen of the United States, residing at Indianapolis, in the county of Marion and State of Indiana, have invented new and useful Improvements in Game-Cards for Teaching Music, of which the following is a specification.

This invention relates to a set of playing cards adapted to be used for the teaching of the rudiments of music.

The purpose of my invention is to devise interesting and positive methods by which children as well as adults will be enabled to learn the rudiments of music without any apparent mental effort and thus eliminate the tedious and tiresome task of memorizing the musical terms and phrases.

In carrying out my invention, I provide a pack of fifty-five playing cards which comprise fourteen suits or books, the cards of six of the suits having thereon musical notations positioned on the lines and spaces of the treble clef, while another six of the suits contain the musical notations positioned on the lines and spaces in the bass clef. The cards of one of the remaining two suits have thereon the signs including the signatures of the keys, expression marks, etc., the cards of the remaining suit having thereon the different values of notes and rests. The cards in the suits relating to the treble clef are divided into suits according to the position of the notes in the clef, for instance, the cards in the suit which I term "lines in treble" are five, each card having a musical character positioned upon one of the lines of the staff while the remaining cards have the characters positioned upon the remaining lines of the staff. The remaining suits in the treble clef are similar to the one just described except that the musical characters are positioned in the following suits, spaces in treble, lines above in treble, lines below in treble, spaces above in treble and spaces below in treble. In the bass clef the suits have been divided in a manner similar to the suits of the treble clef as to the position of the musical notations upon the spaces and lines. Thus it will be seen that I have provided a deck of cards which completely covers the fundamental principles of harmony so that a player after having become experienced in the game will be thoroughly familiar with the more important rudiments of music and apparently without any mental effort.

I am fully aware that it has been hitherto proposed to design playing cards to combine amusement with instruction in the rudiments of music, but in all of the musical educational game cards with which I am familiar, the indicia contained thereon is of such a narrow scope as to be incapable of giving a person a complete knowledge of the rudiments of music.

In the accompanying drawings illustrating my invention, Figures 1, 2, 3, 4, 5 and 6 represent one card in each of the six suits wherein the musical notations are positioned on the lines and spaces of the treble clef. Figs. 7, 8, 9, 10, 11 and 12 represent one card in each of the six suits in the bass clef showing the musical characters positioned upon the lines and spaces. Figs. 13, 14, 15, 16, 17, 18 and 19 show the cards in the suit of notes and rests. Figs. 20, 21, 22, 23 and 24 represent cards of the suit of signs. Fig. 25 represents the joker.

Referring to the drawings and more particularly to Fig. 1, 1 designates a card which is in this instance the first card of the suit of "lines in treble" and shows the card subdivided into upper and lower sections 2 and 2 respectively, the sections being divided by parallel spaced transversely extending lines 4. Printed between the lines 4 is the name of the suit which is in this instance "lines in treble" indicated as at 5, and indicates that the remaining cards in the suit have the musical notations positioned upon the lines in the treble. The upper section of the card 2 at one edge thereof is a musical staff 6 having the clef marked 7 and the musical character 8, the symbol being arranged above the staff as at 9 and having the number of the line upon which the musical character 8 is positioned, arranged adjacent the symbol 9 as at 10. In the lower section of the card is arranged the symbols 11 of the musical characters in all of the cards in the suit to which the sign 5 relates and the corresponding lines or spaces upon which the respective symbols are located, the symbol indicating the musical character disclosed upon the staff in the upper section, being indicated by a star as at 12. In the four corners of the card are the symbol pips 13 indicating the musical character upon the staff. Having described the indicia upon one of the cards, in one of the suits, it is thought that it is unnecessary to describe, in detail, the remaining cards in the suits relating to the position of the notes in the treble clef, the only difference being that the respective suits to which the cards relate are indicated by the name of the suit as shown upon the medial portion of the cards. In the first suit there being five lines in the treble clef, it is evident that there will be five cards to complete the suit whereas the suit of "spaces in treble" contains four cards.

In order to prevent confusion in the reading of the musical characters above and below the treble clef, I have provided suits for the lines above and below and for the spaces above and below, making four suits in all. In the suit of the "lines above the treble" I have found it necessary to only show three lines above the staff with the musical character upon each line, the three cards completing the suit, this would accordingly necessitate three cards for the suit of the "spaces above the treble", there being three spaces between the last line of the staff and the third line above as will be understood. In the next suit, which is the "lines below in treble" three cards are also used to complete the suit, there being three lines below the treble clef, and this necessitates another suit of "spaces below in treble" which also contains three cards.

Referring to Fig. 7, I have shown one of the cards in the suits of the base clef, the card being divided into the upper and lower sections 2 and 3 as in Fig. 1 and having the bass clef 14 in the upper section instead of treble clef. The name of the suit is indicated by the indicia contained between the parallel lines as that in Fig. 1 and has in the lower section of the card the symbols of the notes in the respective suit and their corresponding lines. The suits in the bass clef are six in number, as that of the treble clef, and contain the same number of cards in each suit, and have the notes of each suit arranged as disclosed; therefore it is thought that it is unnecessary to describe the suits and cards in the bass clef. To enable the players to quickly read their notes and to instantly distinguish the cards in the bass clef from those in the treble, I print all cards pertaining to the bass clef in red.

Figure 13:
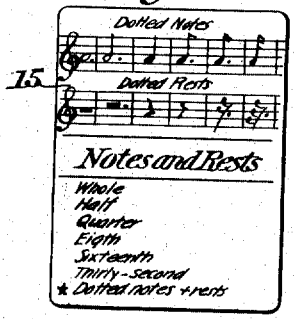
Figure 14:
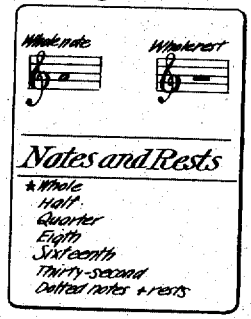
Figure 15:
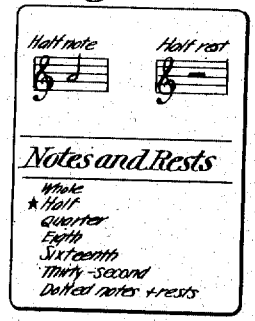
Figure 16:
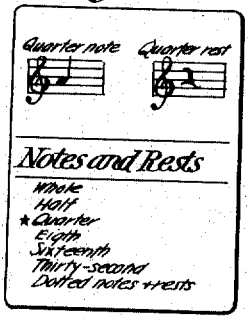
Figure 17:
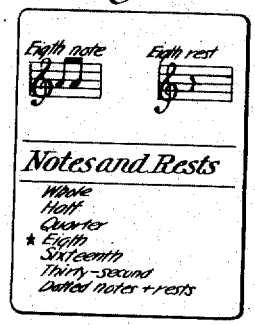
Figure 18:
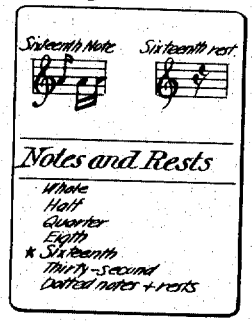

In order to give the player a thorough knowledge of the value of the notes and rests of different values I have formed another suit which consists of seven cards, and is designated as the "notes and rests" suit, the respective cards of the suit being shown in Figs. 13 to 19 inclusive. In this suit each of the cards is arranged in upper and lower sections as described in Fig. 1, the upper section containing a staff upon which the notes and rests of different valuations are positioned as at 15, while the lower section contains the names of all of the cards in the suit, the character of the note upon the card being indicated by the star as in Fig. 1. In this suit I have shown all notes and rests arranged from the whole note and rest to the thirty-second note and rest including the dotted notes and rests as is shown in Fig. 13.

In order to familiarize the player with the signs relating to keys, expression marks, tempo, and time, I have formed still another suit which comprises five cards, the cards and the indicia contained thereon being shown in Figs. 20 to 24 inclusive. This suit is indicated by the word "Signs" arranged at the medial portion of the card while in the upper section thereof is the subject and the information relating thereto printed directly thereunder, the lower section containing the names of the different cards of the suit and indicating the information contained upon the respective card by means of the star, as in the other suits that I have described.

Fig. 25 designates the joker card which contains miscellaneous musical information other than that disclosed on the cards belonging to the different suits. The holder of this card will have certain liberties when playing the game as will be hereinafter described.

Having described the suits and the respective cards contained in each of the suits, I will now describe one method of playing the game, but I wish it to be clearly understood that I do not restrict myself to the method hereinafter described.

The object of the game is to capture as many suits as possible each deal. After the cards are thoroughly mixed, the dealer gives one card around, starting with the player on the left, until each player has three cards, he then places the balance of the pack on the table. The player on the left starts the game by calling for some card that will help him make a suit, with the card or cards in his hand—always designating the player he desires the card from. Should he capture this card, he is entitled to call for another and continue calling until he fails, he then draws one from the pack on the table. If he draws the card he called for, or another card that will complete a suit in his hand, he is entitled to call again, remembering to first designate from whom he desires the card. Each suit as completed is laid aside to the player's credit. If a player uses all the cards in his hand to complete suits, he is entitled to draw one card and start again. After the pack is exhausted the play continues until all books are captured. Two, three or more deals may constitute a game as agreed upon by the players.

The player holding the joker may, at any time during the deal, call for any card in the pack—first designating the player he desires the card from. If he secures the card he called for, he continues to call for the other cards belonging to that suit until he secures the complete suit. Then the joker should be laid aside and be of no further use during the deal. When he fails to secure a card called for, he forfeits the joker to the player designated.

After the last deal the player having the greatest number of points to his credit wins the game, each suit or book counting a certain number of points, the amount of which may be determined by the players. Any number of persons may play this game, but it has been found in practice that three or five players makes the most interesting game.

It is thought from the foregoing taken in connection with the accompanying drawings that the manner of playing the game will be clearly understood without further description, and that minor changes in the information contained upon certain of the suits and the number of cards in each suit may be made without departing from the spirit and scope of the appended claims.

What I claim is:

1. A pack of cards comprising a plurality of suit cards, the cards of one suit having thereon musical notations positioned on the lines of a staff, and the cards of another suit having thereon musical notations positioned on the spaces of a staff.

2. A pack of cards comprising a plurality of suit cards, one suit having thereon musical notations positioned on the lines of a treble clef, the cards of another suit having musical notations positioned on the spaces of the treble clef, the cards of one suit having the musical notations thereon positioned upon the lines of the bass clef, and the cards of another suit having the musical notations thereon positioned upon the spaces of said bass clef.

3. A pack of cards comprising a plurality of suit cards, one suit having thereon musical notations positioned on the lines of a treble clef, the cards of another suit having musical notations positioned on the spaces of the treble clef, the cards of one suit having the musical notations thereon positioned upon the lines of the bass clef, the cards of another suit having the musical notations thereon positioned upon the spaces of said bass clef, and all cards of all the suits having indicia thereon indicating the character of the notes in the suit and the name of the suit.

4. A pack of cards comprising a plurality of suit cards, the cards of one suit having thereon musical notations positioned on the lines of a staff, the cards of another suit having thereon musical notations positioned on the spaces of a staff, another suit having thereon musical notations of different values and the corresponding rests positioned upon a staff.

5. A pack of cards comprising a plurality of suit cards, the cards of one suit having thereon musical notations positioned on the lines of a staff, the cards of another suit having thereon musical notations positioned on the spaces of a staff, another suit having thereon musical notations of different values and the corresponding rests positioned upon a staff, and another suit having thereon the signs used in music.

6. A pack of cards comprising a plurality of suit cards, the cards of one suit having thereon musical notations positioned on the lines of a staff, the cards of another suit having thereon musical notations positioned on the spaces of a staff, another suit having thereon musical notations of different values and the corresponding rests positioned upon a staff, another suit having thereon the signs used in music, and a joker card having thereon miscellaneous musical information not contained upon the other cards.

In testimony whereof I affix my signature in presence of two witnesses.

EUGENE E. NOEL.

Witnesses:
CLARA RAY,
CLYDE P. MILLER.

Copies of this patent may be obtained for five cents each, by addressing the "Commissioner of Patents, Washington, D. C."